United States Patent
Liu

(10) Patent No.: US 8,127,127 B2
(45) Date of Patent: Feb. 28, 2012

(54) SYSTEM AND METHOD FOR TRANSFERRING CONFIGURATION INFORMATION TO AN EMBEDDED DEVICE USING A COMMAND LINE INTERFACE

(75) Inventor: Wei Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 911 days.

(21) Appl. No.: 12/146,915

(22) Filed: Jun. 26, 2008

(65) Prior Publication Data

US 2009/0327682 A1 Dec. 31, 2009

(51) Int. Cl.
*G06F 15/177* (2006.01)
(52) U.S. Cl. ................... 713/2; 713/1; 713/100
(58) Field of Classification Search .............. 713/1, 2, 713/100
See application file for complete search history.

(56) References Cited

U.S. PATENT DOCUMENTS

| | | | |
|---|---|---|---|
| 6,009,540 A * | 12/1999 | Craft et al. | 714/30 |
| 7,676,671 B2 * | 3/2010 | Van Rooyen | 713/2 |
| 2003/0074491 A1 * | 4/2003 | Cepulis | 710/2 |
| 2007/0043882 A1 | 2/2007 | Natarajan | |
| 2007/0094489 A1 * | 4/2007 | Ota et al. | 713/2 |
| 2008/0005551 A1 | 1/2008 | Swanson | |
| 2008/0040525 A1 * | 2/2008 | Lin et al. | 710/302 |

* cited by examiner

*Primary Examiner* — Nitin Patel
(74) *Attorney, Agent, or Firm* — Baker Botts L.L.P.

(57) ABSTRACT

A system and method is disclosed for transferring configuration information to an embedded device associated with an option ROM during those periods in which the option ROM is disabled. The method of the present invention involves the enumeration of PCI devices within the system and the determination of whether the PCI devices are associated with an option ROM and whether the option ROM is enabled. If the embedded device is associated with an option ROM and if the option ROM is not enabled, the option ROM is loaded to a shadow memory and the command-line interface of the option ROM is called to transfer configuration data to the embedded device. The option ROM is later removed from shadow memory to remove the footprint of the option ROM in shadow memory.

21 Claims, 2 Drawing Sheets

US 8,127,127 B2

SYSTEM AND METHOD FOR TRANSFERRING CONFIGURATION INFORMATION TO AN EMBEDDED DEVICE USING A COMMAND LINE INTERFACE

TECHNICAL FIELD

The present disclosure relates generally to computer systems and information handling systems, and, more particularly, to a system and method for transferring configuration information to a device using a command line interface.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

A group of information handling systems may be networked together, and managed from a common node. In one example, a group of blade servers can be managed through a single chassis management controller. The chassis management controller manages a pool of medium access control (MAC) addresses, and it is desirable for each blade server to be assigned a MAC address that is virtual, and thereby persistent. If a blade server in the network is replaced, it may be desirable to assign to the replacement server the MAC addresses associated with the replaced blade server, thereby allowing the replacement blade server to seamlessly operate with the network and the security features of the network. Within each server, the MAC addresses of the server are maintained in the LAN-on-Motherboard (LOM) of the server.

To provide a virtual MAC address to the LOM of the server, the system BIOS of the blade server must retrieve the MAC addresses from the chassis management controller and pass those MAC addresses via a command line protocol interface to the LOM. The string commands of the command line protocol interface are passed to the LOM through the option ROM of the LOM. If the option ROM of the LOM is not initialized or is not otherwise available, it may be difficult to pass the MAC addresses to the LOM. In addition the difficulty of providing MAC addresses to a LOM of a server, the use of a command line protocol interface to pass data to a device having an option ROM presents challenges if the option ROM is not available. Similarly, it is often difficult to pass configuration information to any embedded device that includes an option ROM, if the option ROM is not initialized or is otherwise not available. Similarly, for any embedded device in which configuration information is passed to the device through the option ROM of the device, it may be difficult or impossible to pass configuration information to the device if the option ROM of the device is not enabled.

SUMMARY

In accordance with the present disclosure, a system and method is disclosed for transferring configuration information to an embedded device associated with an option ROM during those periods in which the option ROM is disabled, such as being disabled through a BIOS setup utility. In operation, the method of the present invention involves the enumeration of PCI devices within the system and the determination of whether the PCI devices are associated with an option ROM and whether the option ROM is enabled. If the embedded device is associated with an option ROM and if the option ROM is not enabled, the option ROM is loaded to a shadow memory and the command-line interface of the option ROM is called to transfer configuration data to the embedded device. The option ROM is later removed from shadow memory to remove the footprint of the option ROM in shadow memory.

The system and method disclosed herein is advantageous in that it operates with the existing option ROM code of the affected device of the server system. As a result, complex code for writing configuration data to the storage of the embedded device is not necessary. The system and method disclosed herein is also advantageous in that it provides a system and method in which configuration data can be passed to the embedded device even if an option ROM associated with the device is not enabled. In addition, the system and method disclosed herein is technically advantageous because it is not limited in its application to the transfer of only certain kinds or instances of configuration information. Rather, the system and method disclosed herein can be used to transfer configuration data to any embedded device of the system having an option ROM accessible through a software interface. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

The system and method disclosed herein concerns the use of the command-line protocol (CLP) interface of an option ROM of an embedded device for the purpose of passing configuration information to the storage of the embedded device. The system and method disclosed herein enables configuration information to be saved to the embedded device even if the option ROM of the embedded device is not initialized or is otherwise not available. The option ROM could be disabled through a BIOS setup utility.

Figure 1:
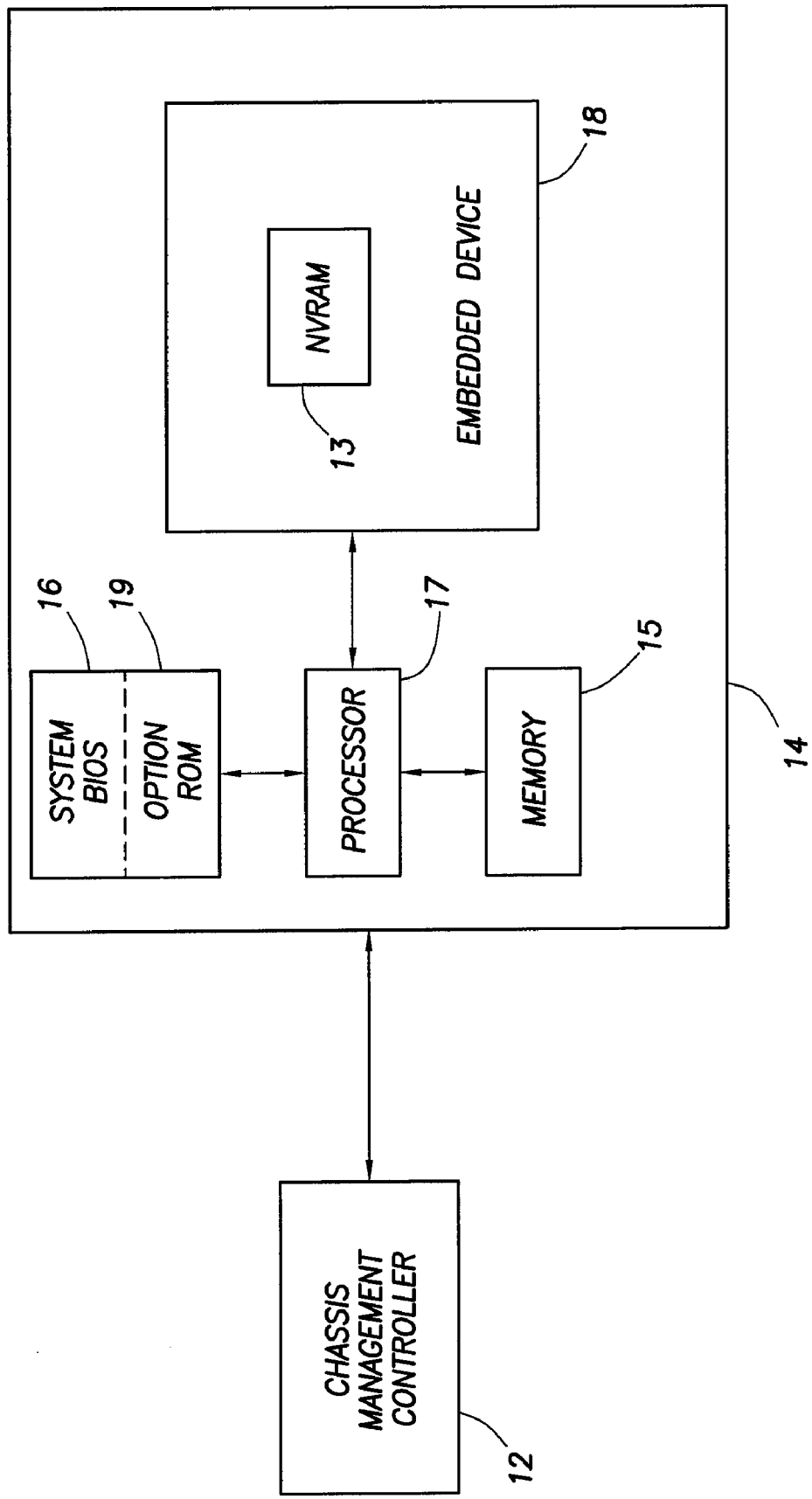
FIG. 1 is a diagram of a computer network.

Shown in FIG. 1 is a diagram of a computer network, which is indicated generally at 10. A chassis management controller 12 is coupled to a server system 14. Although only one server system is shown in FIG. 1, a chassis management controller may be communicatively coupled to multiple server systems 14. Server system 14 includes a system BIOS 16 that includes an option ROM 19. Each of the system BIOS 16 and the option ROM 19 are communicatively coupled via a processor 17 to a LAN-on-motherboard (LOM) device 18. LOM 18 is an example of an embedded device that uses an option ROM for passing configuration information to the embedded device. Processor 17 is also coupled to memory 15. System BIOS 16 is operable to execute on the processor 17 of the server system 14. LOM 18 includes storage 13, which may comprise non-volatile RAM (NVRAM) 13. In the example of FIG. 1, configuration data in the form of MAC addresses of the server system 14 are saved to storage 13 of LOM 18. Other configuration data may be saved to the storage of the embedded device.

Figure 2:
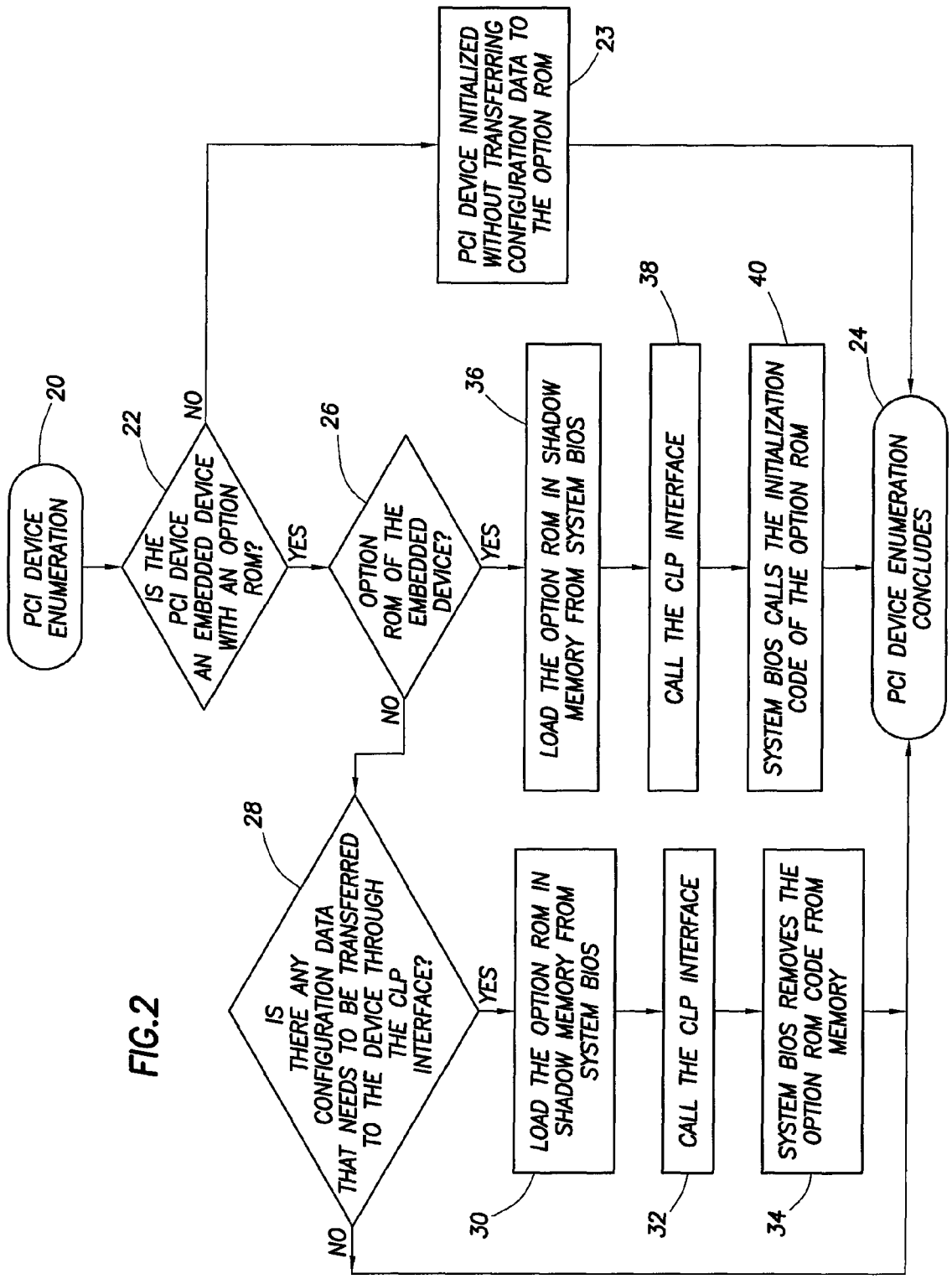
FIG. 2 is a flow diagram of the method for transferring configuration information to the embedded device using a software interface.

The system and method disclosed herein provides a method for transferring configuration data to the embedded device using a command line protocol interface, even if the option ROM associated with the embedded device is not enabled. A flow diagram of the method for transferring configuration information to the embedded device using a software interface is shown in FIG. 2. At step 20, a PCI device enumeration process is initiated. The PCI device enumeration process involves an analysis of each PCI device of the server system according to the steps outlined in the flow diagram of FIG. 2. At step 22, a first PCI device is selected and it is determined if the PCI device is an embedded device that is associated with an option ROM. If it is determined at step 22 that the selected PCI device is not a PCI device that is associated with an option ROM, initialization of the device is allowed to proceed without the necessity of configuration data to the option ROM of the PCI device (step 23). Following step 23, and assuming that all PCI devices of the server system have been enumerated, the process concludes at step 24.

If it is determined that the selected PCI device is associated with an option ROM, the process continues with step 26, which involves a determination of whether the option ROM associated with the embedded device is enabled. If the option ROM associated with the embedded device is enabled, the option ROM from the system BIOS is loaded to memory 15 at step 36. At step 38, the system BIOS calls the CLP interface. As part of step 38, system BIOS 16 passes CLP strings of code to the option ROM to configure the settings of the option ROM before calling the initialization code of the option ROM to execute the code of the option ROM. At step 40, system BIOS 16 calls the initialization code of the option ROM, causing the option ROM associated with the embedded device to execute, causing the configuration information to be passed to the embedded device. In the example in which the embedded device is a LOM and the configuration data are MAC addresses, the execution of the option ROM of the LOM transfers the MAC addresses to the LOM. Following step 40, and assuming that all PCI devices of the server system have been enumerated, the process concludes at step 24.

If it is determined at step 26 that the option ROM associated with the embedded device is not enabled in the system BIOS, it is next determined at step 28 if there is any configuration data that needs to be transferred to the embedded device through the CLP interface. If no configuration data needs to be transferred to the embedded device through the CLP interface, the PCI device enumeration process concludes at step 24. If it is determined at step 28 that a CLP interface is needed to pass data to the embedded device, including MAC addresses to the LOM as one example, the option ROM from system BIOS is loaded into memory 15 at step 30. Thus, even though the option ROM of the embedded device is disabled, the option ROM is loaded into memory. At step 32, the system BIOS calls the CLP interface. As part of step 32, system BIOS passes the configuration data, such as MAC addresses in the case of a LOM as the embedded device, to the option ROM as a CLP command and executes the option ROM code. The execution of the option ROM code causes the configuration data to be saved to the storage of the embedded device. In the example of FIG. 1, the MAC addresses are saved to the NVRAM storage of the embedded device. At step 34, the system BIOS removes the option ROM code from memory. Following steps 30, 32, and 34, the configuration data is saved to the embedded device without the necessity of execution the initialization code of the disabled option ROM software. In the example of FIG. 1, MAC address of the server system or other configuration data may be saved to the LOM without the necessity of executing the initialization code of the disabled option ROM software. Following step 34, and assuming that all PCI devices of the server system have been enumerated, the process concludes at step 24. The process steps of FIG. 2 may be repeated until the steps of FIG. 2 have been performed with respect to all of the PCI devices of the server system.

The system and method disclosed herein is advantageous in that it operates with the existing option ROM code of the affected device of the server system. As a result, complex system BIOS code for writing configuration data to the storage of the embedded device is not necessary. The system and method disclosed herein is also advantageous in that it is not limited to the transfer of MAC addresses to a LOM. Rather, the system and method disclosed herein can be used to transfer configuration data to any embedded device of the system having an option ROM accessible through a software interface. Although the present disclosure has been described in detail, it should be understood that various changes, substitutions, and alterations can be made hereto without departing from the spirit and the scope of the invention as defined by the appended claims.

What is claimed is:

1. An information handling system, comprising:
   a system BIOS software associated with the information handling system;

an embedded device, wherein the embedded device includes storage;

an embedded device BIOS software associated with the embedded device, wherein the embedded device is communicatively coupled to the embedded device BIOS software;

a processor coupled to the embedded device;

a BIOS element coupled to the processor, wherein the BIOS element comprises the system BIOS software and the embedded device BIOS software;

a memory coupled to the processor;

wherein the system BIOS software cause the processor to (a) transfer the embedded device BIOS software to the memory; (b) execute a command-line protocol to transfer configuration data to the embedded device BIOS software stored in memory; and (c) execute the embedded device BIOS software stored in memory to cause the configuration data to be saved to the storage of the embedded device, wherein the configuration data is generated at a chassis management controller coupled to the information handling system.

2. The information handling system of claim 1, wherein the embedded device BIOS software includes an option ROM associated with the embedded device.

3. The information handling system of claim 1, wherein the configuration data is addressing data.

4. The information handling system of claim 3, wherein the addressing data is a medium access control address.

5. The information handling system of claim 1, wherein the BIOS software associated with the embedded device is disabled.

6. The information handling system of claim 1, wherein the storage of the embedded device is non-volatile RAM.

7. The information handling system of claim 1, wherein the embedded device comprises a LAN-on-motherboard device.

8. The information handling system of claim 7, wherein the configuration data is addressing data.

9. The information handling system of claim 8, wherein the addressing data is the medium access control address of the LAN-on-motherboard device.

10. The information handling system of claim 8, wherein the BIOS software of the embedded device is disabled.

11. A method for transferring a configuration data to a device of a computer system, wherein the computer system includes a temporary memory location, wherein the device is associated with an option ROM and wherein the device includes storage, and wherein the configuration data is generated at a chassis management controller coupled to the computer system, comprising:

determining if the option ROM is disabled, wherein the option ROM is stored in a BIOS element of the computer system;

if the option ROM is disabled, transferring the option ROM to the temporary memory location;

initiating at a processor of the computer system the execution of the option ROM to enable a software interface associated with the option ROM;

using the software interface to transfer the configuration data to the storage of the device.

12. The method for transferring a configuration data to a device of a computer system of claim 11, wherein the configuration data is addressing data.

13. The method for transferring a configuration data to a device of a computer system of claim 12, wherein the addressing data is medium access control data.

14. The method for transferring a configuration data to a device of a computer system of claim 11, wherein the storage of the device is non-volatile RAM.

15. The method for transferring a configuration data to a device of a computer system of claim 11, wherein the embedded device comprises a LAN-on-motherboard device.

16. The method for transferring a configuration data to a device of a computer system of claim 15, wherein the configuration data is addressing data.

17. The method for transferring a configuration data to a device of a computer system of claim 16, wherein the addressing data is the medium access control address of the LAN-on-motherboard device.

18. The method for transferring a configuration data to a device of a computer system of claim 11, further comprising the step of removing the footprint of the option ROM from memory.

19. An information handling system, comprising:

an embedded device;

a processor coupled to the embedded device;

a BIOS element coupled to the processor, wherein the BIOS element comprises a system BIOS software associated with the information handling system and a software interface associated with the embedded device;

a memory coupled to the processor;

wherein the system BIOS software cause the processor to initiate the software interface associated with the embedded device, and use the software interface to transfer configuration data to the embedded device, wherein the configuration data is generated at a chassis management controller coupled to the information handling system.

20. The information handling system of claim 19, wherein the software interface of a command-line protocol interface.

21. The information handling system of claim 19, wherein the configuration data is addressing data for the embedded device.

* * * * *